Sept. 18, 1928.
J. F. O'CONNOR
1,684,507
ANTIFRICTION ROLLER BEARING
Filed Jan. 14, 1924
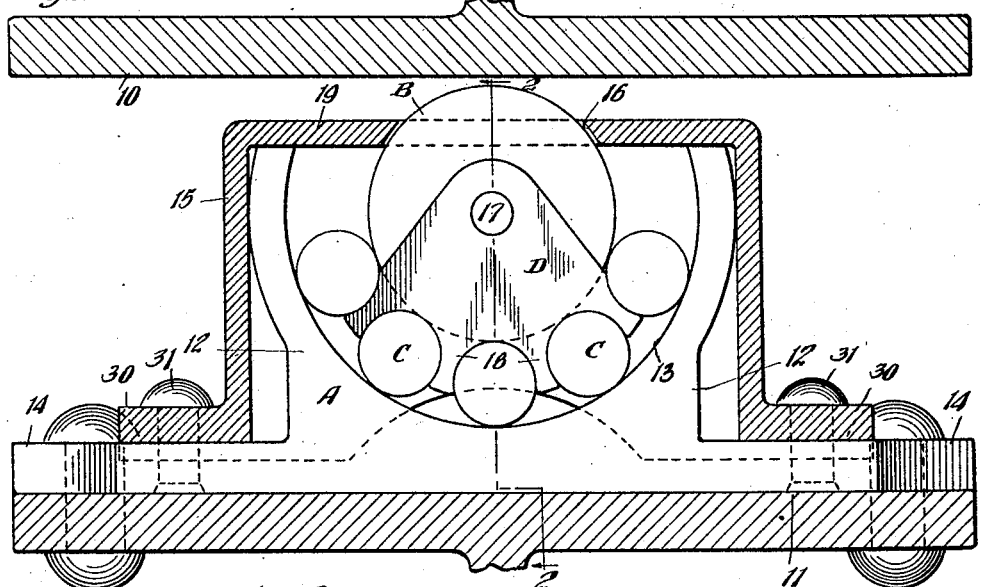
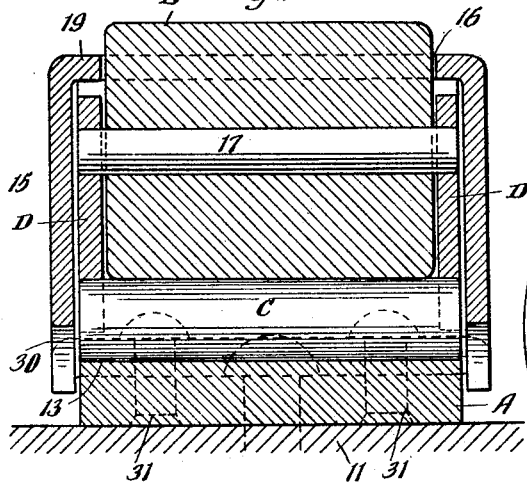
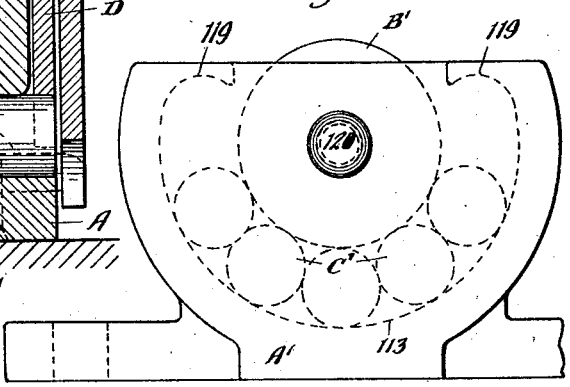
Witnesses
Wm. Geiger
Inventor
John F. O'Connor
By George J. Haight
His Atty.

Patented Sept. 18, 1928.

1,684,507

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

ANTIFRICTION ROLLER BEARING.

Application filed January 14, 1924. Serial No. 686,008.

This invention relates to improvements in anti-friction roller bearings.

One of the objects of the invention is to provide an anti-friction bearing adapted particularly for use in railway car construction and wherein the friction is reduced substantially to a minimum.

Another object of the invention is to provide a bearing of the kind described, having but a few simple parts of rugged construction, so that the bearing is economical to construct and will give reliable and efficient service in actual use.

In the drawing forming a part of this specification, Figure 1 is a vertical sectional view through the ends of the body and truck bolsters of a railway car, showing the improved bearing in place on the truck bolster. Figure 2 is a vertical sectional view taken on the line 2—2 of Figure 1, and Figure 3 is a side elevation of a modified form of construction.

Referring to the construction illustrated in Figures 1 and 2, 10 denotes the under side of the body bolster of a railway car and 11 the upper part of the opposed corresponding truck bolster. The improved bearing is shown applied to the truck bolster and, as shown, comprises a supporting member A; a bearing roller B; a series of supporting or auxiliary rollers C; and spacing frame D.

The retaining member A is formed with end walls 12, the sides and top being open as shown. Lugs 14 are provided by which this member may be riveted or otherwise suitably secured to the bolster. On its interior, the member A is provided with a curved bearing surface 13 which is symmetrically arranged with respect to the center of the member A and in actual practice, this bearing surface will preferably be struck on a radius whose center coincides substantially with the axis of the bearing roller B. The curved surface 13 provides a trackway as will be hereinafter described.

A cover or housing 15 is arranged to cooperate with the under part of the supporting member A and to enclose the open sides thereof, the top wall 19 of said cover having an opening 16 therethrough, through which a portion of the anti-friction element or bearing roller B projects for engagement with the body bolster 10. Said housing 15 has suitable flanges 30 at its ends by which it may be permanently attached to the member A as by rivets 31 and thereby retain all the parts assembled during shipment and after application to the car.

Auxiliary anti-friction rollers C are interposed between the bearing roller D and the surface 13 of the raceway so as to support the bearing roller and transmit the thrust therefrom to the support A.

The side frames D are arranged one at each end of the bearing roller B, fingers 18 being provided at the lower ends of said frames, to engage between the adjacent auxiliary or supporting rollers and keep them in properly spaced relation. The plates or frames D are pivotally connected to the bearing roller B by means of a pin 17, there being a slight clearance between the pin and the bearing roller.

The operation of the device is as follows: When the body bolster comes into engagement with the bearing roller B and the latter is rotated about its relatively fixed axis, the supporting rollers C will also be rotated and caused to travel upwardly of the curved bearing surface 13 in one direction, depending upon the direction of rotation of the bearing roller. The portions 19 of the cover plate project into the path of movement of the supporting rollers, that is, they project into the raceway so as to form stops for limiting the movement of the supporting rollers and prevent the rollers from coming out.

As the supporting roller B does not travel bodily but rotates about a relatively fixed axis, any desired travel of the body bolster bearing surface thereon may be provided for and the friction between the various parts will be reduced to a minimum. Upon removal of the actuating pressure, it is evident that the supporting rollers together with the frames D will automatically return to their central normal position under the influence of gravity, so that these parts are self-centering without the aid of any extraneous devices.

In the modification shown in Figure 3, the supporting member and housing represented by the reference characters A and 15, respectively, of the form previously described, are combined into a single member designated as A', thus presenting a construction of a lesser number of parts. Said member A', which combines the support and housing, is provided with suitable flanges at the bottom by which it may be secured to the bolster as clearly indicated in Figure 3. On its interior, the member A' is provided with a curved raceway 113 concentric with the bearing roller B', said raceway 113 having end stops 119 formed integrally with the member A'.

A plurality of anti-friction supporting rollers C' are interposed between the bearing member B' and the member A', there preferably being at least 5 of said supporting rollers C' so as to always positively insure at least 3 of said rollers being at the bottom of the bearing roller B', even at the end of an extreme movement, to thus properly distribute the load and prevent possibility of a too concentrated load on any one supporting roller. In the construction shown in Figure 3, the parts are held in assembled relation by the pin 120, which is passed through the bearing roller B', and held by the side walls of the member A'.

I have herein shown and described what I now consider the preferred manner of carrying out my invention but the same is merely illustrative and I contemplate all changes and modifications that come within the scope of the claim appended hereto.

I claim:

In an anti-friction bearing, the combination with a housing including side and end walls, said end walls being provided with inwardly extending overhanging flanges spaced apart a sufficient distance to permit projection of a bearing portion of an anti-friction element therethrough and said side walls also having overhanging flanges of less extent than the flanges on said end walls, said housing being open at the bottom and provided with outwardly extending lugs at each end; of a bearing member to which said lugs are adapted to be secured, said member being provided with a curved bearing surface projecting upwardly into said housing to provide a semi-circular raceway; a main anti-friction roller projecting outwardly from said housing between the flanges thereof, said roller being of a greater size than the opening between said flanges; and a plurality of smaller rollers extending transversely substantially entirely across said housing and adapted to roll on said raceway, said smaller rollers, in normal position, being disposed along said raceway circumferentially about said main roller to support the latter in relatively fixed position for rotation about its axis.

In witness that I claim the foregoing I have hereunto subscribed my name this 12th day of January, 1924.

JOHN F. O'CONNOR.